United States Patent [19]

Raymond

[11] Patent Number: 5,253,468
[45] Date of Patent: Oct. 19, 1993

[54] CROP CHOPPING MACHINE

[76] Inventor: Robert Raymond, 4775 Greenholme Dr., Sacramento, Calif. 95842

[21] Appl. No.: 753,431

[22] Filed: Sep. 3, 1991

[51] Int. Cl.$^5$ .................... A01D 34/66; A01D 34/86
[52] U.S. Cl. .................... 56/503; 56/121.4; 56/229
[58] Field of Search .......... 56/229, 255, 256, 295, 56/503, 504, 121.4, 121.41, 121.43, 121.46

[56] References Cited

U.S. PATENT DOCUMENTS

| | | | |
|---|---|---|---|
| 4,261,163 | 4/1981 | Shaw | 56/327.1 |
| 4,489,787 | 12/1984 | Gary | 172/1 |
| 4,796,711 | 1/1989 | Chrysler | 172/33 X |

*Primary Examiner*—Terry Lee Melius

[57] ABSTRACT

A machine for chopping strawberry plants or other row crops consisting of a rotating blade that describes a plane approximately parallel to the plane formed by the top of the beds on which the crop is planted, with a spacer rigidly attached to the underneath side of the rotating blade. Said spacer is circular in shape, with a flat top and a bottom curved in the shape of a dinner plate, with a smooth bottom surface, and rotates coaxially with the knife. The machine also has knives angled to reach down the sloping sides of the bed to chop the stems and leaves that hang into the furrow. Said side knives also have circular spacers rigidly attached, similar in shape to the top knife spacer, rotating coaxially with the side knives. Said spacers prevent said knives from digging into the plastic film laid on top of the bed and destroying it. The framework supporting these rotating knives is raised and lowered by a gauge wheel so that the height of the knives above the surface of the bed remains relatively constant. The framework is counterbalanced so that the gauge wheels exert minimum pressure on the plastic film.

2 Claims, 2 Drawing Sheets

CROP CHOPPING MACHINE

BACKGROUND

1. Field of Invention

This invention relates to agricultural crops, such as fruits and vegetables, that are grown in rows on beds, specifically to a machine to chop these crops when their growing season is over.

2. Description of Prior Art

Many vegetable and fruit crops are grown in rows on beds that are formed up above field level, with irrigation furrows formed below field level between them. When planting strawberries, for example, the grower will often lay a small plastic drip-irrigation tube along the top of the bed and then cover the bed with a thin strip of plastic film along its entire length. The plastic film covers the top of the bed and down the sloping sides part way into the furrow. The strawberry plants grow through holes in the plastic film on top of the bed. During the early part of the growing season, the plastic film keeps the bed warmer than exposed soil because of the greenhouse effect, accelerating plant growth. Later, as the berries mature, the plastic film keeps them from contacting the moist soil underneath, which deters the formation of mold.

At the end of the picking season, many growers like to chop their plants back for a second year growth. They will cut off all the stems and leaves of the plants to about one inch above the plastic film. This allows the growers to harvest a second crop a few weeks later without incurring the large expense of field preparation and replanting.

Heretofore this chopping operation has been done by hand, which is very expensive, or with tractor drawn field mowers of either the flail or rotary type. There are two significant drawbacks associated with the use of field mowers. They often rip up large pieces of the plastic film and drip irrigation tubing, and they do not reach down the sides of the beds and chop the leaves and stems that hang into the furrow.

OBJECTS AND ADVANTAGES

Accordingly, several objects and advantages of my invention are:

(a) To perform the chopping operation by machine while greatly reducing the damage to the plastic film on the bed.

(b) To perform the chopping operation by machine with chopping elements that reach down the sloping sides of the bed and chop most of the stems and leaves that hang into the furrow.

(c) To provide a machine that will perform this chopping operation automatically without requiring any special skills on the part of the operator.

Further objects and advantages of my invention will become apparent from a consideration of the drawings and ensuing description of it.

DRAWING FIGURES

REFERENCE NUMERALS IN DRAWINGS

| | | | |
|---|---|---|---|
| 10 | frame | 40 | side motor |
| 12 | parallel arm | 42L | left side knife mount |
| 14 | pivot pins | 42R | right side knife mount |
| 16 | floating frame | 44 | clamp |
| 18 | top knife | 46 | cap |
| 20 | top knife spacer | 48 | side knife tube |
| 22 | top motor | 50 | set screw |
| 24 | center gauge wheel | 52 | bolt |
| 26 | caster fork | 54 | nut |
| 28 | adjusting screw | 56 | side wheel tube |
| 30 | spring | 58 | axle |
| 32L | left side shaft | 60L | left side gauge wheel |
| 32R | right side shaft | 60R | right side gauge wheel |
| 34 | bearing | 62 | plastic film |
| 36L | left side knife | 64 | plastic drip irrigation tube |
| 36R | right side knife | 66 | top of bed |
| 38L | left side knife spacer | 68 | sloping side of bed |
| 38R | right side knife spacer | 70 | furrow |

DESCRIPTION OF INVENTION

Figure 1:
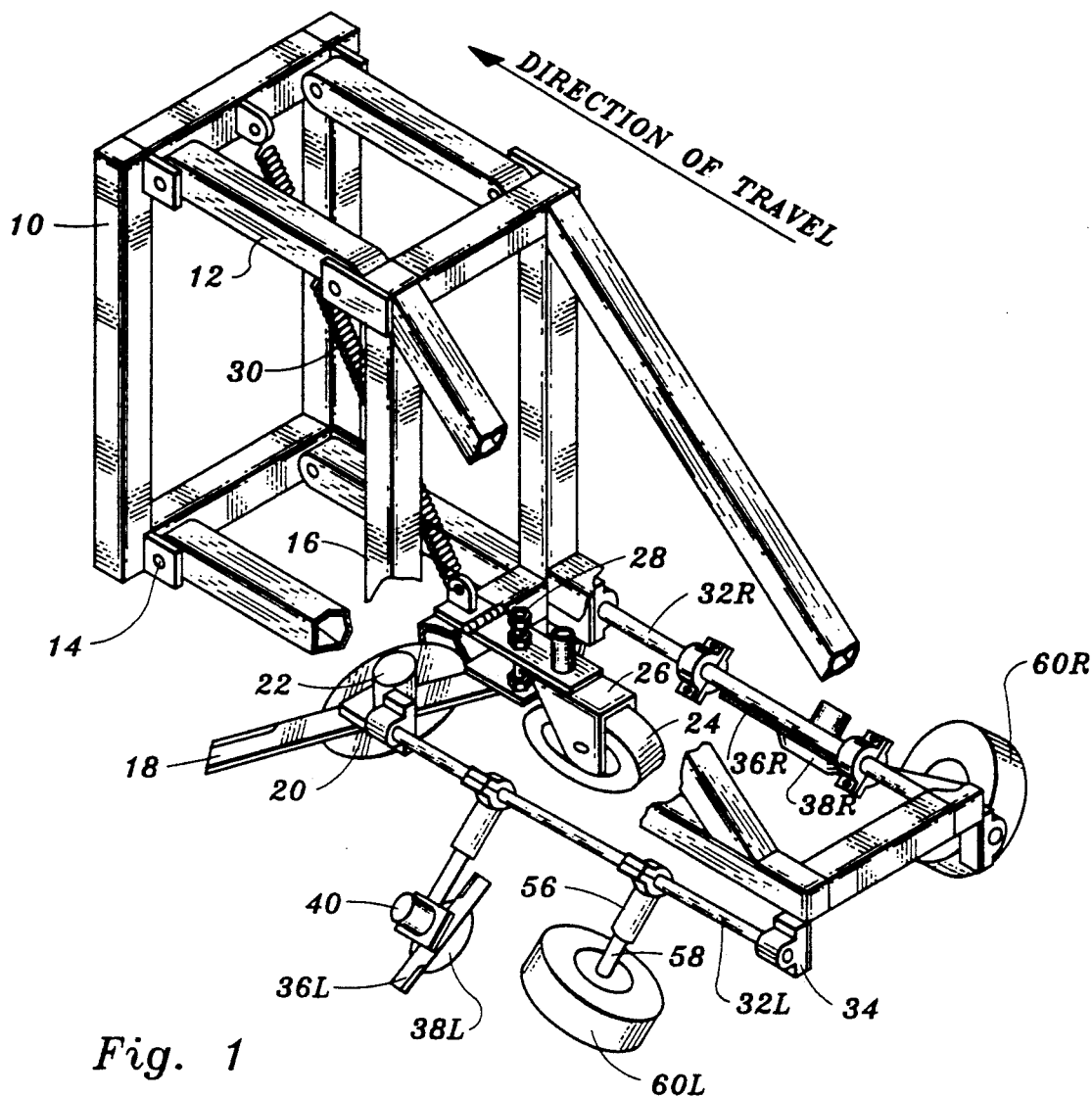
FIG. 1 shows an isometric view of the preferred configuration of the Crop Chopper.

FIG. 1 shows a perspective view of a basic version of my crop chopper. (In this and all the views, safety guards over the cutting elements are not shown so that the underlying mechanism can be seen.) The frame 10 is attached to a wheeled farm tractor, usually by its three point hitch, in such a way that the top knife 18 is positioned directly over the center of a bed of plants to be chopped. Four parallel arms 12 of equal length are attached to frame 10 by pivot pins 14 or bearings. Floating frame 16 is attached to the rearward ends of parallel arms 12 with identical pivot pins 14. A spring 30 extends from the upper cross member of frame 10 to a lower cross member of floating frame 16.

Suspended rigidly from the center of the lower forward member of floating frame 16 is a hydraulic motor, top motor 22. The shaft of top motor 22 is pointed downward with the center line of the shaft being approximately perpendicular to the plane that describes the top of the beds. Rigidly attached to the motor shaft is top knife 18. A top knife spacer 20 is firmly attached to the underneath side of top knife 18. Top knife 18 is a flat blade that rotates in a plane approximately parallel to the plane described by the top of the beds. The top knife spacer 20 is attached to and rotates coaxially with the top knife. Spacer 20 is flat on top where it attaches to knife 18, and its bottom side is curved like the shape of a dinner plate so that it presents a smooth, gently curved surface to the plastic film on top of the bed. The preferred material for spacer 20 is ultra high molecular weight polyethylene which has excellent wear characteristics.

A left side shaft 32L is attached to the lower left hand portion of floating frame 16 by bearings 34. One bearing 34 is located toward the front of floating frame 16, and one is located toward the rear of floating frame 16. The centerline of shaft 32L is thus approximately parallel to the plane described by the tops of the beds, and co-linear with the direction of travel of the machine.

Figure 4:
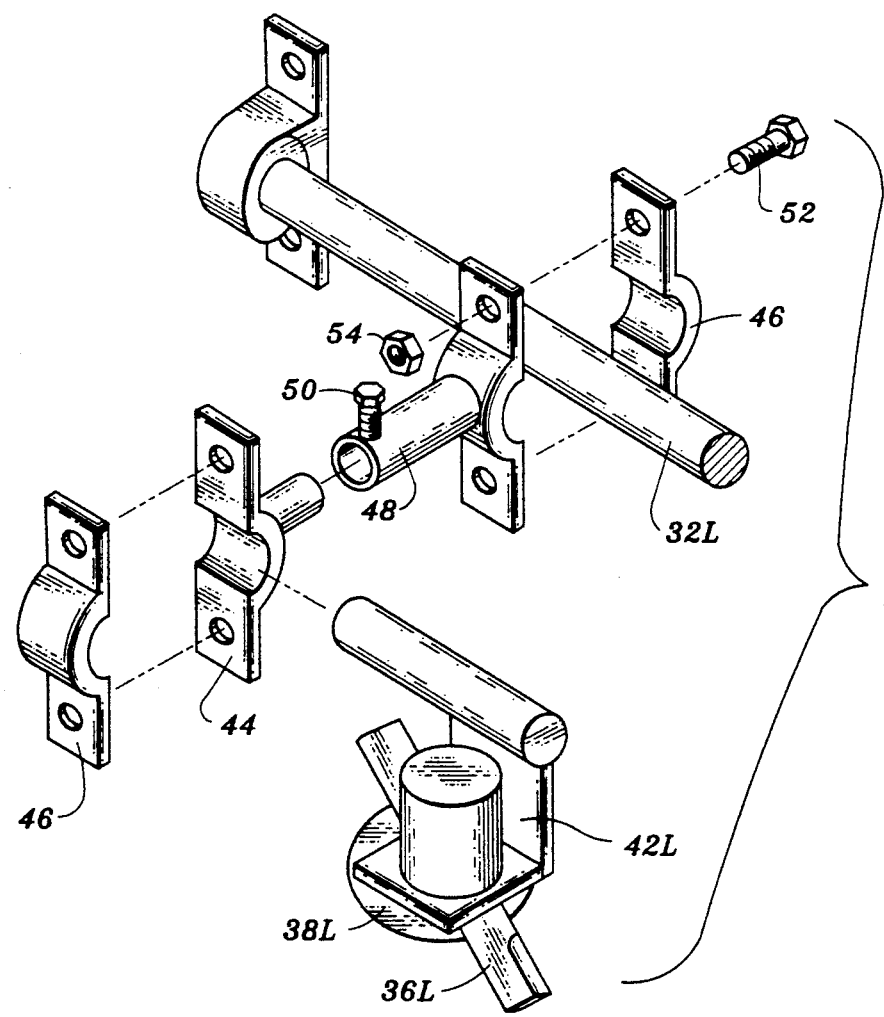
FIG. 4 shows a preferred mounting arrangement for the side knives that allows universal adjustment of the angle and position at which the knife attacks the stems and leaves.

Rigidly attached to the forward portion of shaft 32L by cap 46 is side knife tube 48. Clamp 44, shown in greater detail in FIG. 4, has a round bar portion which inserts into side knife tube 48 and is locked in place at any desired angle or extension by set screw 50. Cap 46 bolts to clamp 44, firmly securing the round shaft portion of side knife mount 42L. with this round shaft being secured so that side knife spacer 38L can be presented to the side of the bed at any desired angle.

Hydraulic side motor 40L is rigidly attached to left side knife mount 42L. Left side knife 36L is rigidly coupled to the shaft of side motor 40L, and left side knife spacer 38L is rigidly attached to the underneath side of left side knife 36L, and turns coaxially with it. The shape of left side knife spacer 38L is similar to, but smaller than the top knife spacer 20 described above.

Toward the rearward portion of left side shaft 32, side wheel tube 56 is firmly attached to the left side shaft 32L by cap 46. Axle 58 inserts into side wheel tube 56 and is held in place at any desired extension by a set screw. Left side gauge wheel 60L rotates freely on axle 58.

A hinged frame 27 is rigidly attached at one end to the center portion of a cross member of the forward portion of floating frame 16. A caster fork 26 is secured through its vertical pin to the rearward portion of hinged frame 27. Center gauge wheel 24 rotates freely in caster fork 26, and is positioned so that it will touch the top of the bed slightly behind the arc of the tip of top knife 18. An adjusting screw 28 extends from the free portion of hinge 27 to a rigid portion of floating frame 16, adjusting and maintaining the depth of center gauge wheel 24.

Figure 3A:
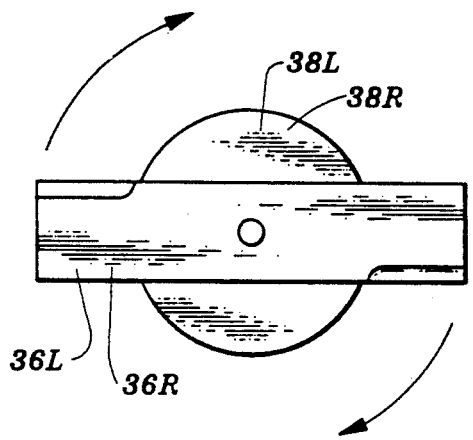
FIGS 3A and 3B show a typical chopping element (knife) with its spacer rigidly attached to the knife.
Figure 3B:
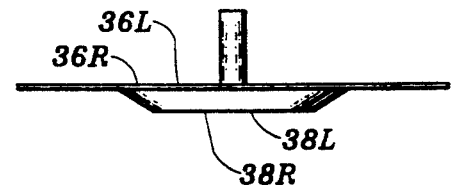

FIG. 3 shows a plan and side view of the side knives 36L & 36R. Side knife spacers 38L & 38R are rigidly attached to and rotate coaxially with side knives 36L & 36R. Top knife spacer 20 is generally the same thickness, similar in shape, and larger in diameter.

Figure 2:
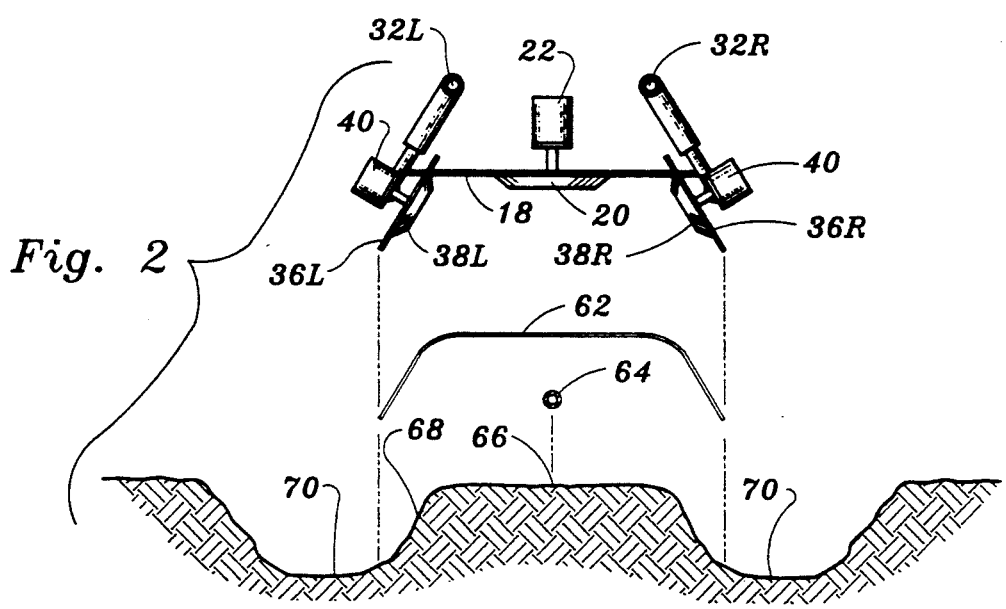
FIG. 2 shows an exploded elevation of the chopping elements over a bed in the field, showing the orientation of these cutting elements in relation to the bed.

FIG. 2 shows a cross sectional view of a typical bed in a field. 66 is the top of the bed, 68 is the sloping side of the bed, and 70 is the furrow. Before planting, the plastic drip irrigation tube 64 is laid along the top of the center of the bed along its full length, and then the bed is covered along its full length with plastic film 62. The upper portion of FIG. 2 shows the orientation of top knife 18, and side knives 36L & 36R of the machine as it travels the length of a bed.

OPERATION OF THE INVENTION

In operation, the frame 10 is attached to the three-point hitch of a farm tractor, which then raises the machine off the ground. The operator then drives the tractor into the field, lining up the tractor wheels with the furrows. This orients the cutting knives directly above the crop to be chopped. The operator then lowers the machine with the three-point hitch control until the center gauge wheel 24 rests gently on top of the bed. The spring 30 supports most of the weight of the floating frame 16, thus assuring only a light touch of the center gauge wheel 24 against the plastic film on top of the bed. The center gauge wheel 24 can then be adjusted by adjusting screw 28 so that the top knife spacer 20 just barely touches the plastic film on top of the bed. Gravity pulls the side gauge wheels 60L & 60R downward, causing the left and right side shafts 32L & 32R to rotate in bearings 34. When the side gauge wheels 60L & 60R contact the sloping sides of the bed, 68 in FIG. 2, rotation of the side shafts will cease. Then, by loosening the caps 46 and set screw 50 in FIG. 4, the side knife spacers 38L & 38R can be positioned so they barely touch the plastic film on the sloping sides of the beds. The caps 46 and set screw 50 are then tightened.

The operator then engages the hydraulics to start the knives 18, 36L & 36R turning, and proceeds forward through the field with the tractor. The top knife 18 cuts the stems and leaves off to a height approximately equal to the thickness of the top knife spacer 20. This spacer, crucial to the effective operation of the machine, slides gently along the top of the plastic film 62, and assures that the top knife 18 cannot dig into the plastic film 62 and the irrigation tube 64 and tear them up. Because the spring 30 supports most of the weight of the floating frame with all of its attached equipment, the center gauge wheel 24 rolls along with a light touch on the plastic film 62. If the tractor rocks or lurches, the center gauge wheel 24 raises or lowers the floating frame 16 to compensate, keeping the height of the top knife 18 relatively constant. In addition, since the floating frame 16 is supported by the parallel arms 12, when the center gauge wheel 24 moves the floating frame 16 up and down, the plane described by the rotation of the top knife 18 remains approximately parallel to the plane of the top of the beds.

The side knives 36L & 36R are angled so they will cut most of the stems and leaves that hang over the sides of the bed into the furrows. The side gauge wheels 60L & 60R roll freely along in gentle contact with the plastic on the sloping sides of the bed. Being rigidly clamped to the side shafts 32L & 32R, the side gauge wheels 60L & 60R will cause the side shafts to rotate if the tractor lurches or if the side gauge wheels roll over a bump. Being rigidly clamped to the side shafts 32L & 32R, the side knives 36L & 36R will be raised or lowered accordingly by the rotation of the side shafts. The side knife spacers 38L & 38R slide gently along the plastic film, keeping the side knives 36L & 36R from tearing up the plastic film.

Thus the reader will see that the Crop Chopping Machine of the invention closely chops the stems and leaves of the strawberry plants while protecting the thin plastic film covering the bed; chops most of the stems and leaves hanging down into the furrows; and can be operated by persons with ordinary tractor driving skills.

While the above description contains many specificities, these should not be construed as limitations on the scope of the invention, rather as an exemplification of one preferred embodiment thereof. Many other variations are possible. For example, the spacers that keep the knives from cutting into the plastic film can be fabricated from other materials that can be machined to a smooth surface such as steel, or even wood. Also a gauge shoe connected to a hydraulic servomechanism can be used in place of the center gauge wheel 24. This servomechanism would raise and lower the floating frame 16 by means of a hydraulic cylinder in place of spring 30.

Accordingly, the scope of the invention should be determined not by the embodiment(s) illustrated, but by the appended claims and their legal equivalents.

I claim:

1. A cutting device for cutting plant material grown on raised beds, said raised beds having a material forming a surface underlying said plant material, in a field of row crops comprising:
   (a) said raised beds each including a top surface forming a top plane, and two sloped side surfaces forming two sloped side planes, and
   (b) a first rotating cutting means, the rotation of which describes a plane approximately parallel to the plane of the top surface, and (c) a generally circular spacer rigidly attached to the side of said rotating cutting means nearest to the material being cut, said spacer being rounded on the side opposite said rotating cutting means, whereby said cutting means is prevented from contacting said material underlying the material being cut, and (d) two or more additional rotating cutting means, including two or more additional generally circular spacers, said additional rotating cutting means being positioned with their described planes being approximately parallel to the planes of the sloping side surfaces, whereby said additional rotating cutting means cut the plant material hanging down the sloping side surfaces.

2. The cutting device of claim 1 wherein the distance between the first rotating cutting means, and all additional cutting means, and the surface of the material underlying the material being cut is controlled by gauge means.

* * * * *